(12) United States Patent
Lin et al.

(10) Patent No.: US 7,499,055 B2
(45) Date of Patent: Mar. 3, 2009

(54) METHOD OF FONT GENERATION FOR DISPLAYING THE THICKNESS OF STROKES OF CHARACTERS

(75) Inventors: Yu-Jen Lin, Chia-I (TW); Cheng-Peng Kuan, Taipei (TW); Chih-Chia Chien, Yun-Lin (TW); Yun-Ei Wu, Tao-Yuan (TW)

(73) Assignee: Industrial Technology Research Institute, Hsin-Chu (TW)

( * ) Notice: Subject to any disclaimer, the term of this patent is extended or adjusted under 35 U.S.C. 154(b) by 219 days.

(21) Appl. No.: 10/289,319

(22) Filed: Nov. 7, 2002

(65) Prior Publication Data

US 2004/0041811 A1  Mar. 4, 2004

(30) Foreign Application Priority Data

Aug. 27, 2002  (TW) .............................. 91119334 A

(51) Int. Cl.
*G06T 11/00* (2006.01)

(52) U.S. Cl. ........................ 345/467; 345/468; 345/469; 345/469.1; 345/470; 345/441; 345/442; 382/185; 382/186; 382/202; 382/203; 382/301; 382/316

(58) Field of Classification Search ................. 345/470, 345/469.1, 472.3, 467–469, 611; 382/301, 382/200, 316

See application file for complete search history.

(56) References Cited

U.S. PATENT DOCUMENTS

| 5,434,959 | A | * | 7/1995 | Von Ehr et al. | ............. | 345/441 |
| 5,870,107 | A | | 2/1999 | Fujisawa et al. | | |
| 5,940,084 | A | * | 8/1999 | Motokado et al. | ........... | 345/468 |
| 6,157,750 | A | * | 12/2000 | Choi et al. | .................. | 382/301 |
| 6,288,725 | B1 | * | 9/2001 | Fu | .............. | 345/467 |
| 6,373,490 | B1 | * | 4/2002 | Bendiksen et al. | .......... | 345/441 |
| 6,909,430 | B2 | * | 6/2005 | Dresevic et al. | ............. | 345/443 |
| 7,239,318 | B2 | * | 7/2007 | Ito et al. | ..................... | 345/467 |

FOREIGN PATENT DOCUMENTS

| CN | 1173673 | 2/1998 |
| CN | 1321954 | 11/2001 |
| EP | 1069549 | 1/2001 |

* cited by examiner

*Primary Examiner*—Antonio A Caschera
(74) *Attorney, Agent, or Firm*—Alston & Bird LLP

(57) ABSTRACT

The present invention employs the notion of a Chinese writing brush in moving a geometric figure to produce a style of calligraphy, where the area of the geometric figure is large or small, then the strokes of a character are thick or thin. Hence the purpose is that the variance of the strokes of a character can be achieved using the present invention. The present invention only decides a moving path for the strokes of a character and the size of a geometric figure at starting points and end points, and then moves the geometric figure along the moving path, where the area the geometric figure passes is the style of calligraphy.

21 Claims, 11 Drawing Sheets

○ 20, 22
□ 24

METHOD OF FONT GENERATION FOR DISPLAYING THE THICKNESS OF STROKES OF CHARACTERS

BACKGROUND OF THE INVENTION

1. Field of the Invention

This invention relates to a method of font generation, and more particularly to a method of font generation for displaying the thickness of strokes of a character.

2. Description of the Prior Art

In general, fonts produced by descriptive methods of characters comprise three types: a bitmap font, an outline font, and a vector font. The three types of descriptive methods of characters are described below.

(1) Bitmap Font:

A descriptive method of a bitmap font is displayed in pixels. As shown in FIG. 1A, an area 2 shown in oblique lines is displayed in an area of the font and a white area 4 without oblique lines is displayed in an outer area of the font. Therefore, the bitmap font is an image of a font and displays the form of a font accurately in a fixed size of the font. Furthermore, the bitmap font easily displays characters in a monitor. However, a disadvantage is that data of the font are large. Moreover, due to the fact that the bitmap font is an image and the size of the bitmap font is fixed, a resized font has a problem with distortion. Hence, the bitmap font is not fit for resizing and a resized font is not a refined and beautiful one.

(2) Outline Font:

As shown in FIG. 2A and FIG. 2B, an outline font is described by means of curves and strokes controlled by control points 8. An outline 10 of an outline font is described by curves. An area surrounded by the curves is a form of the font, as shown in FIG. 1B. In general, a bend of the outline 10 thereof is displayed in a quadratic curve (second-order function) or a cubic Bézier curve (third-order function). Furthermore, the curves of the outline font are described by the stroke thickness of the font. Because of the bend of the outline 10 and the thickness of strokes, the font can be described exquisitely with starting and ending control points 6 and control points 8. The outline font is thereby refined and looks beautiful. Moreover, when compared with a bitmap font, an outline font has less data. A resized outline font still looks refined and beautiful as its original outline font. Therefore, the outline font, e.g., TrueType Font or PostScript, becomes a popular font. A set of Chinese, Japanese, or Korean (CJK) fonts generally includes approximately 7,000 to 18,000 characters in about 5 to 12 mega bytes. For a PDA ("personal digital assistant"), set-top box or cellular phone, the amount of characters stored in these apparatuses is limited due to limitation of memory space.

(3) Vector Font:

A vector font is described by means of central curves and strokes controlled by control points 8, as shown in FIG. 1C. Due to the lack of form description and thickness of strokes, the vector font limits a font 12 to be a lightface or boldface. Therefore, an appearance of font 12 is not refined or beautiful as that of an outline font. However, data of a vector font include mainly central curves of strokes without variants of the form of characters. Hence, the amount of data thereof can be efficiently reduced. As compared with a bitmap font or an outline font, the amount of data for a vector font is minimum. Moreover, a resized font can be performed without distortion.

A current trend of development in information appliances is mobile and exquisite. However, memory limitation in a device will result in a serious problem. Hence, it is desired to have a new descriptive method of characters which not only saves more characters under the limitation of memory and low-resolution of display screens, but also transmits the characters through a limited bandwidth in a shorter time. The present invention can overcome the aforementioned disadvantages and describe refined characters and economize memory.

SUMMARY OF THE INVENTION

Conventional art may need a large number of data to describe refined characters, or need less data to describe characters in lightface or boldface that cannot describe variants in the thickness of characters. In view of the above, it is an object of the present invention to provide a method of font generation for displaying the thickness of strokes of a character with less data.

It is another object of the present invention to provide a method of font generation for displaying the thickness of strokes of a character in a reduced amount of data. Therefore, more characters and more types of characters can be saved given the same memory space and more complicated Chinese, Japanese or Korean (CJK) fonts can be transmitted.

It is a still another object of the present invention to provide a method of font generation for displaying stroke thickness of a character so as to display the character readily and refined on a screen.

It is yet another object of the present invention to provide a method of font generation for displaying stroke thickness of a character so that a user can use exquisite and varied characters.

As aforementioned, the present invention provides a method of font generation for displaying stroke thickness of a character. The method of font generation can decide at least one moving path of the character according to the characteristics of at least one stroke, and decide the dimension of a geometric figure at a plurality of control points. In accordance with the characteristics and the thickness of the at least one stroke, and the path of movement along the center of the geometric figure, the dimension of the geometric figure is varied to form the character. The present invention also provides a method for composing fonts. The method forms a database comprising at least one common basic stroke of at least one character, wherein a method of font generation for the at least one common basic stroke of the at least one character in the database comprises deciding at least one moving path of the character according to the characteristics of the at least one common basic stroke of the at least one character in the database, deciding the dimension of a geometric figure at a plurality of control points according to the characteristics of the thickness of the at least one basic stroke, and varying the dimension of the geometric figure to form the character by moving the center of the geometric figure along at least one moving path. The present invention further provides an apparatus for font generation. The apparatus comprises an assembly deciding at least one moving path of a character according to the characteristics of at least one stroke of the character, an assembly deciding the dimension of a geometric figure at a plurality of control points according to the characteristics of the thickness of the at least one stroke, and an assembly moving the center of the geometric figure along the at least one moving path and varying the dimension of the geometric figure to form the character.

BRIEF DESCRIPTION OF THE DRAWINGS

The aforementioned aspects and other advantages of the present invention will become more readily appreciated and better understood by reference to the following detailed description, when taken in conjunction with the accompanying drawings, wherein.

DESCRIPTION OF PREFERRED EMBODIMENTS

Some sample embodiments of the present invention will now be described in detail. Nevertheless, it should be recognized that the present invention can be practiced in a wide range of other embodiments in addition to those explicitly described. The scope of the present invention is expressly not limited expect as specified in the accompanying claims.

The concept of a Chinese writing brush is employed by the present invention, in which a stroke becomes thicker as more force is applied and a stroke becomes thinner as less force is applied through a Chinese writing brush. A main concept of the present invention is to control the dimension of a geometric figure and a force applied through a Chinese writing brush in order to change the thickness of strokes. The area the geometric figure passes through forms the strokes of a character. The geometric figure may be a circle, an oval-shape form, a rectangle, a square, or other forms (e.g., irregular-shape forms).

Figure 4A:
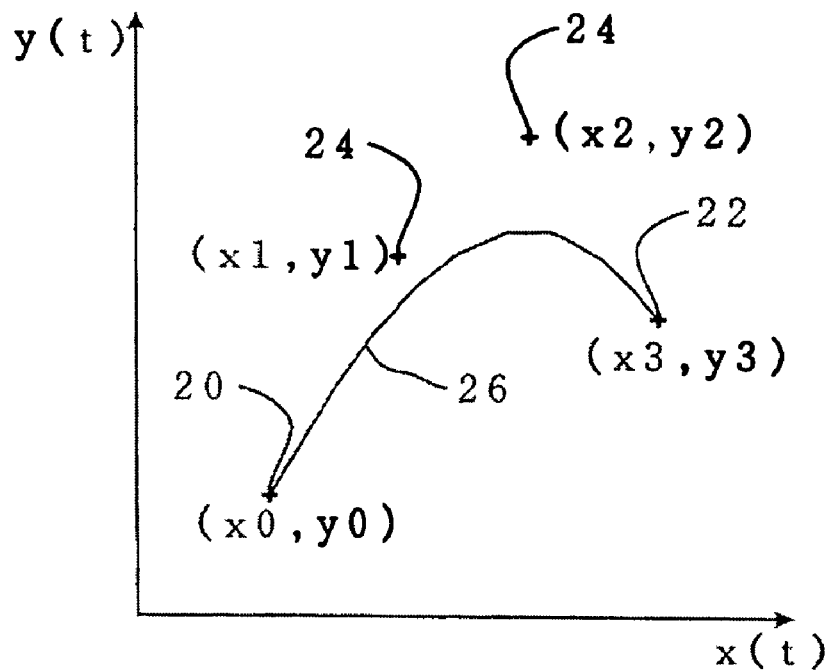
FIG. 4A is a diagram of a moving path described by a cubic equation.
Figure 4B:
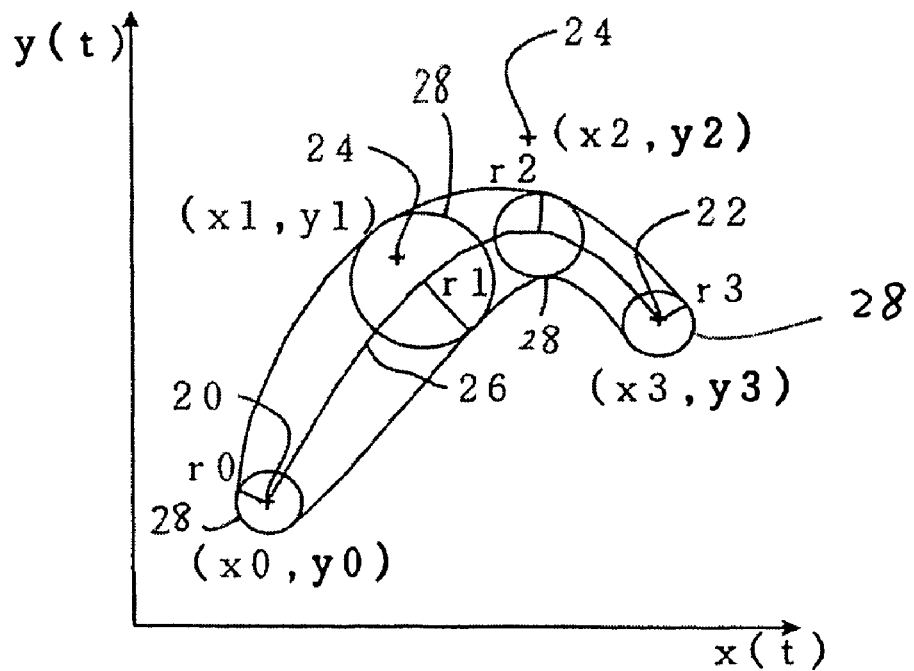
FIG. 4B is a diagram of a stroke described by a parameter of a radius of a circle.
Figure 4C:
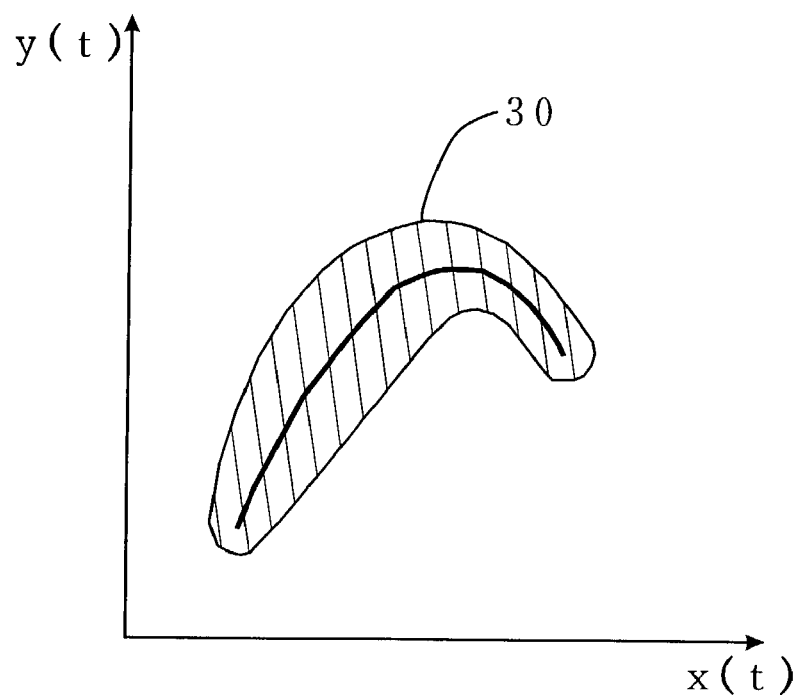
FIG. 4C is a diagram of a stroke passed by a circle.

Referring to FIG. 4A to FIG. 4C, one preferred embodiment of this invention employs a circle 28 (shown in FIG. 4B) to describe the thickness of strokes. In fact, the area of a character 30 should be filled with colors, which are replaced by oblique lines in the drawings. A method consistent with one embodiment of the present invention comprises steps as follows.

1. In accordance with the characteristics of strokes of character 30, moving paths 26 passing through the center of circle 28 and coordinates of starting control points 20, control points 24 and ending control points 22 are decided.

2. In accordance with the thickness of a starting point and an ending point of the strokes, the dimensions of circle 28 for starting control points 20, control points 24 and ending control points 22 are decided.

3. The center of circle 28 on moving path 26 and the dimensions of circle 28 are changed with a function. The function is decided according to the variant of thickness in the strokes.

4. Character 30 is the area where circle 28 moves through.

Figure 1A:
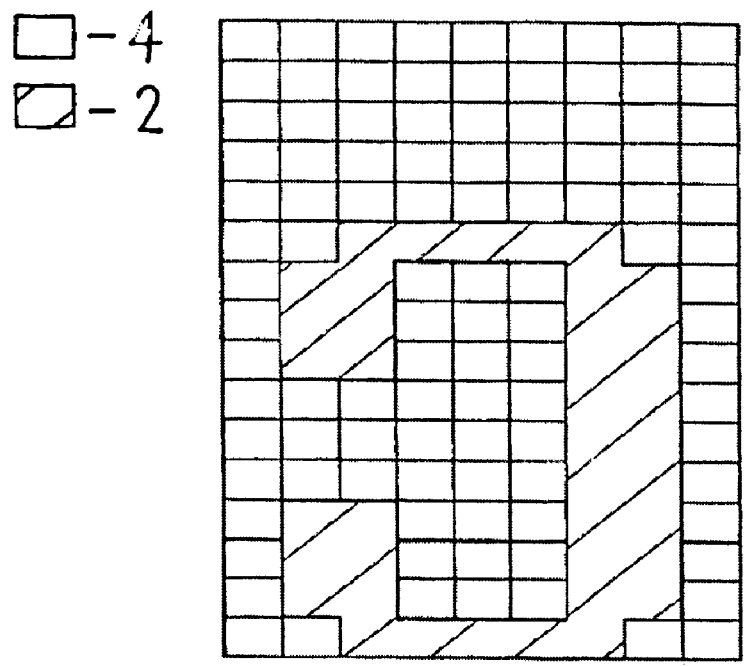
FIG. 1A to FIG. 1C are diagrams of a bitmap font, an outline font, and a vector font, respectively.
Figure 1B:
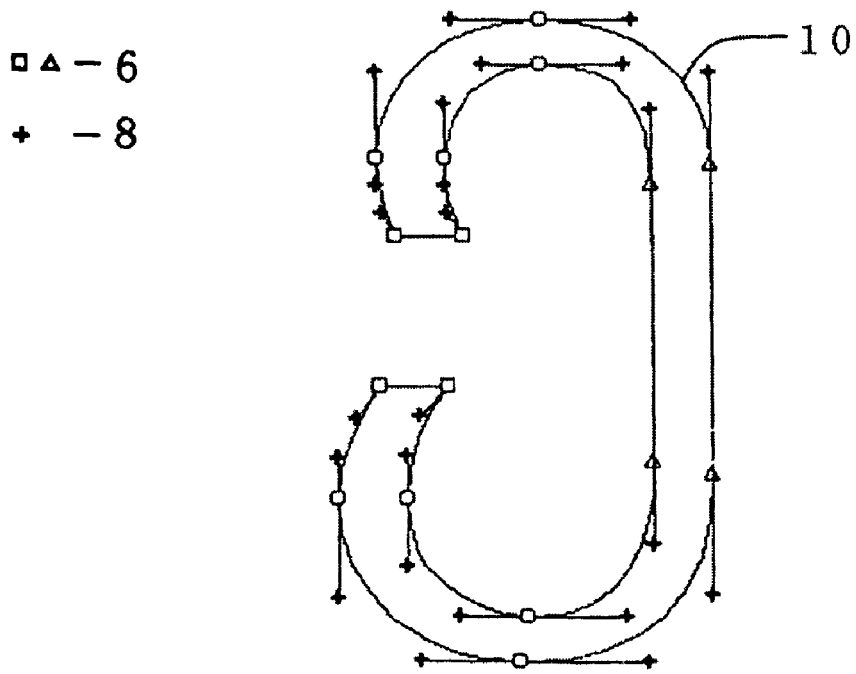
Figure 1C:
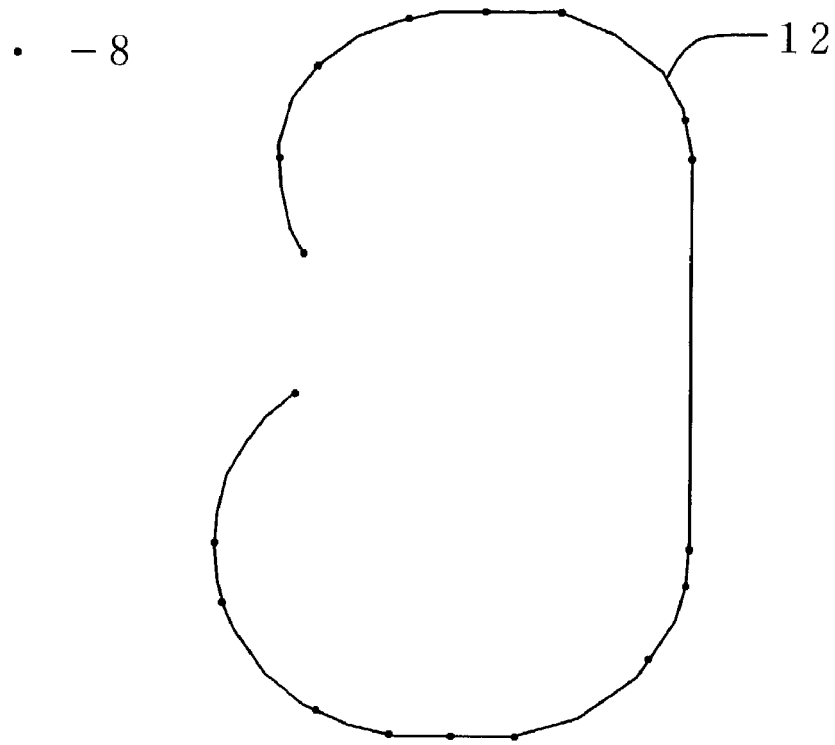
Figure 2A:
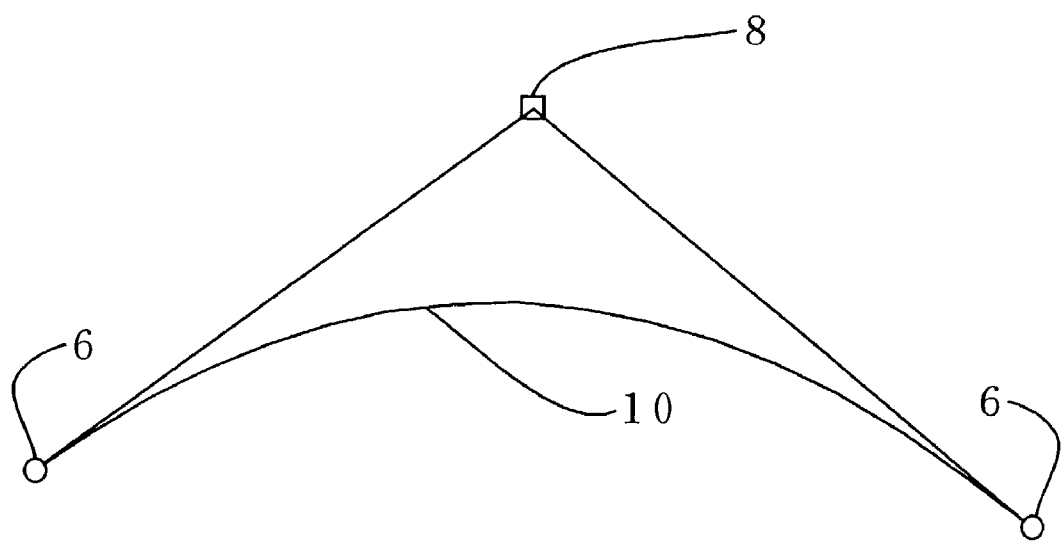
FIG. 2A to FIG. 2B are curves described by a quadratic equation and a cubic equation, respectively.
Figure 2B:
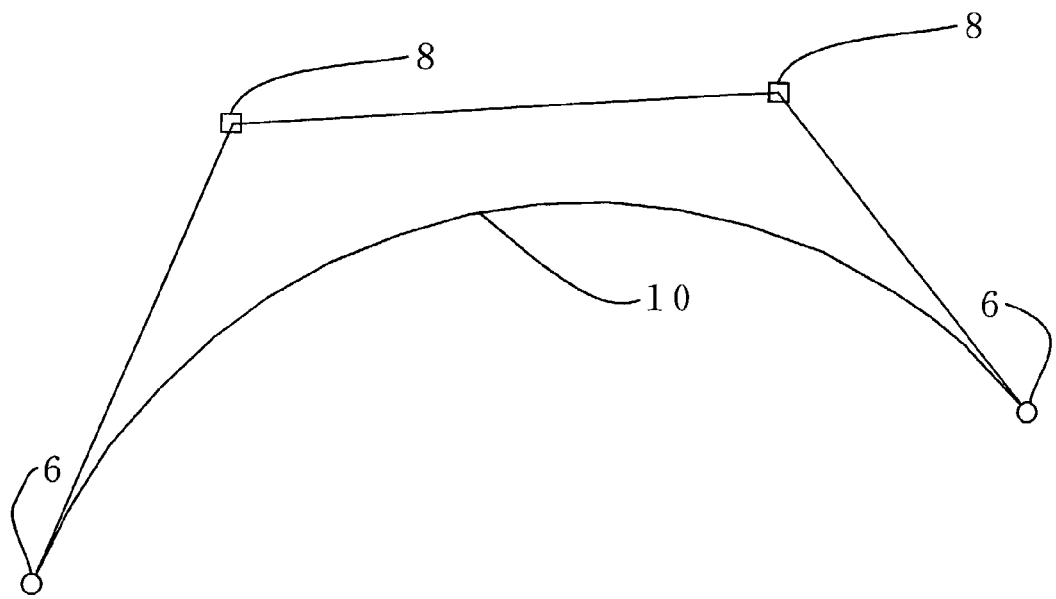
Figure 3:
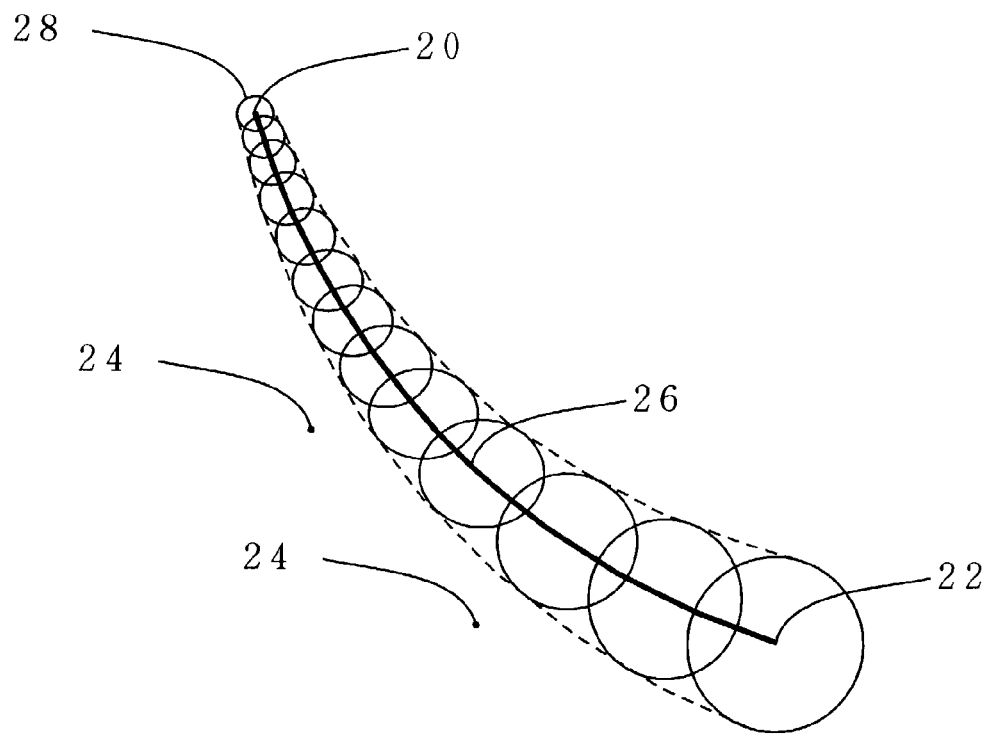
FIG. 3 is a diagram of a circle moving along a moving path.

Step 1: Referring to FIG. 3, in accordance with the characteristics of strokes of a character, moving path 26 for circle 28 and the coordinates of starting control point 20, control points 24, and ending control point 22 are decided. Moving path 26 is described by a first-order function, second-order function, third-order function or a function of higher order that can best describe moving path 26. A first-order function needs the coordinates of one starting control point 20 and one ending control point 22. A second-order function needs the coordinates of one starting control point 20, one ending control point 22 and one control point 24. A third-order function needs the coordinates of one starting control point 20, one ending control point 22 and two control points 24. For example, moving path 26 is described by a third-order function, as shown in FIG. 4A, where $$x(t)=a_3t^3+a_2t^2+a_1t^1+x_0 \quad \text{Equation 1}$$

$$y(t)=b_3t^3+b_2t^2+b_1t^1+y_0 \quad \text{Equation 2}$$

t∈[0,1] being a parameter, where $a_1=3(x_1-x_0)$, $a_2=3(x_2-x_1)-a_1$, $a_3=x_3-x_0-a_2-a_1$, $b_1=3(y_1-y_0)$, $b_2=3(y_2-y_1)-b_1$, and $b_3=y_3-y_0-b_2-b_1$.

Since the function is a third-order function, the coordinates of four points $(x_0, y_0)$, $(x_1, y_1)$, $(x_2, y_2)$ and $(x_3, y_3)$ are needed, wherein $(x_0, y_0)$ is the coordinate of starting control point 20 on moving path 26, $(X_3, y_3)$ is the coordinate of ending control point 24 on moving path 26, $(x_1, y_1)$ and $(x_2, y_2)$ are the coordinates of control points 22 for moving path 26. Moreover, control points 24 are not necessarily located on moving path 26. The parameter t serves to control moving path 26, ranging from 0 to 1. When t is 0, x(0) equals $x_0$ and y(0) equals $y_0$, resulting in the coordinate $(x_0, y_0)$ of starting control point 20. When t is 1, x(1) equals $x_3$ and y(1) equals $y_3$, resulting in the coordinate $(X_3, y_3)$ of ending control point 24. Therefore, a path of the coordinate (x(t), y(t)) at the function of t ranging from 0 to 1 is moving path 26. The variants or bends of moving path 26 can be controlled by changing the coordinates $(x_0, y_0)$, $(x_1, y_1)$, $(x_2, y_2)$ and $(x_3, y_3)$ of starting control point 20, control points 24, and ending control point 22. Therefore, moving path 26 can be described by the above-mentioned Equations 1 and 2.

Step 2: In accordance with the thickness of strokes at a starting control point and an ending control point, the dimensions of the circles at starting control points 20, control points 24 and ending control points 22 are decided. When a stroke is thicker, circle 28 becomes greater, and when a stroke is thinner, circle 28 becomes smaller. The radii, that is, $r_0$ of circle 28 for starting control point 20, $r_1$ and $r_2$ of circles 28 for control points 24, and $r_3$ of circle 28 for ending control point 22, are decided according to the stroke characteristics.

Step 3: The center of circle 28 moves along moving path 26 and the radius of circle 28 is changed with a function. The function is decided according to the variant of thickness of strokes. In accordance with the characteristics of the thickness of different strokes, the variant of strokes can be described with different functions. For example, a function of the radius of circle 28 is described below.

$$r(t)=(r_3-r_0)t+r_0 \; t\in[0,1] \quad \text{Equation 3}$$

where $r_1$ and $r_3$ are the radii of circle 28 at starting control point 20 and ending control point 22, respectively.

The parameter t ranges from 0 to 1. When t is 0, r(0) equals $r_0$, which is the radius of circle 28 at starting control point 20. When t is 1, r(1) equals $r_3$, which is the radius of circle 28 at ending control point 22. Therefore, the radius r(t) at the function of t ranging from 0 to 1 is the radius of a circle at a coordinate (x(t), y(t)). The above-mentioned Equation 3 describes that a stroke gradually becomes thicker or thinner.

Another function is described below.

$$r(t)=c_3t^3+c_2t^2+c_1t^1+c_0 \; t\epsilon[0,1] \quad \text{Equation 4}$$

where
$c_1=3(r_1-r_0)$,
$c_2=3(r_2-r_1)-c_1$, and
$c_3=r_3-r_0-c_2-c_1$.

The $r_0$, $r_1$, $r_2$, and $r_3$ are radii of circles 28 at different points. The radii $r_1$ and $r_2$ depend on the coordinates $(x_1, y_1)$ and $(x_2, y_2)$ of control points 24 and are decided according to the thickness of the strokes. The parameter t is a controlling parameter ranging from 0 to 1. When t is 0, r(0) equals $r_0$, which is the radius of circle 28 at starting control point 20. When t is 1, r(1) equals $r_3$, which is the radius of circle 28 at ending control point 22. The radius r(t) is the radius of circle 28 at the coordinate (x(t), y(t)) on moving path 26 at the function of t ranging from 0 to 1. Equation 4 describes a stroke with three transitions of thickness at most.

Referring to FIG. 4B, when the center of circle 28 moves along moving path 26, the variant of the radius of circle 28 is decided by substituting the value of t in the coordinate (x(t), y(t)) into the radius r(t).

Step 4: Referring to FIG. 4B, character 30 is the area where circle 28 moves through.

Figure 4D:
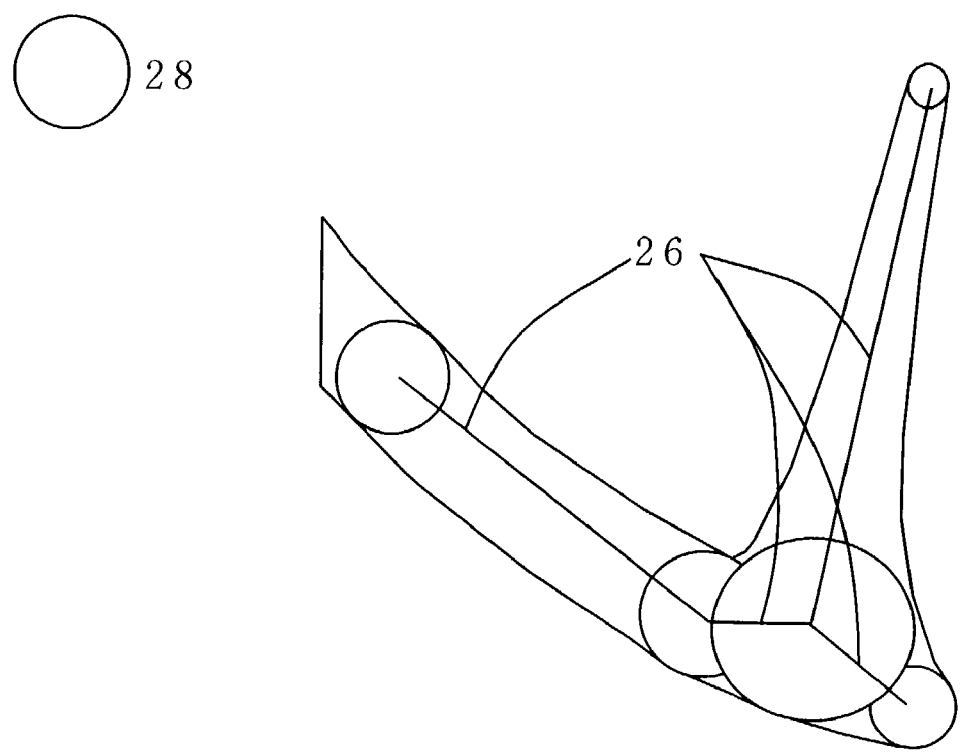
FIG. 4D is a diagram of a complicated stroke.

Moving path 26 can be separated into a plurality of moving paths 26 if a stroke corresponding to moving path 26 has complicated transitions, especially at a starting or ending portion of the stroke. Then starting control points 20, control points 22 and ending control points 24 on moving paths 26 are decided. Moving paths 26 may not be connected with each other and therefore starting control point 20 of one of moving paths 26 may not be connected to ending control point 22 of another one of moving paths 26. Referring to FIG. 4D, the stroke accomplished according to steps 1 to 4 looks refined and beautiful.

Figure 5A:
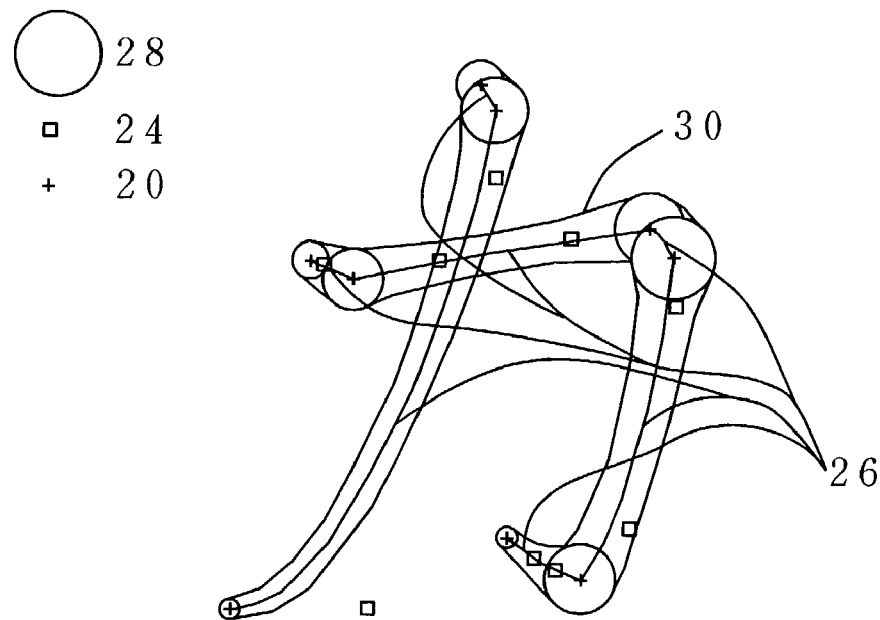
FIG. 5A to FIG. 5D are diagrams of characters formed by means of the present invention.
Figure 5B:
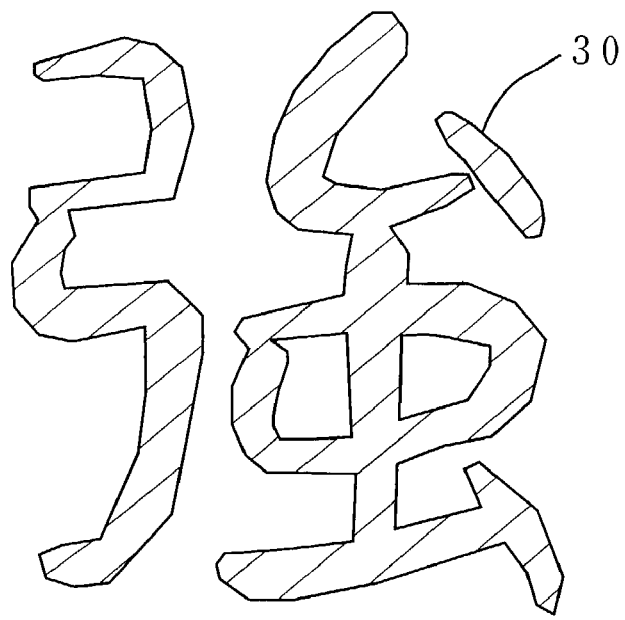
Figure 5C:
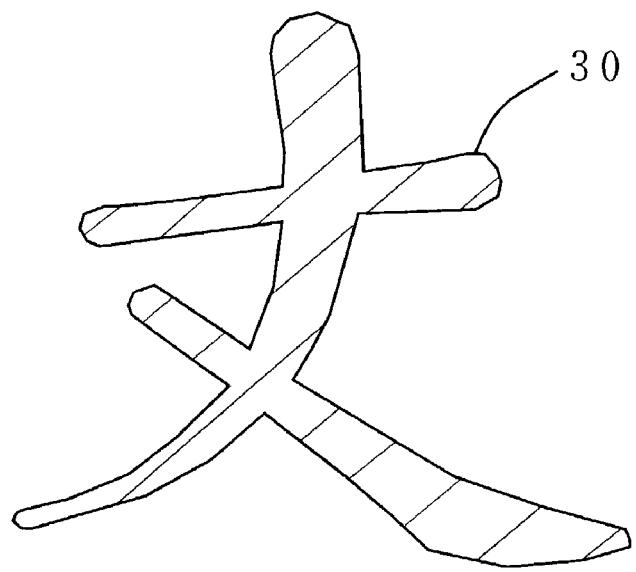
Figure 5D:
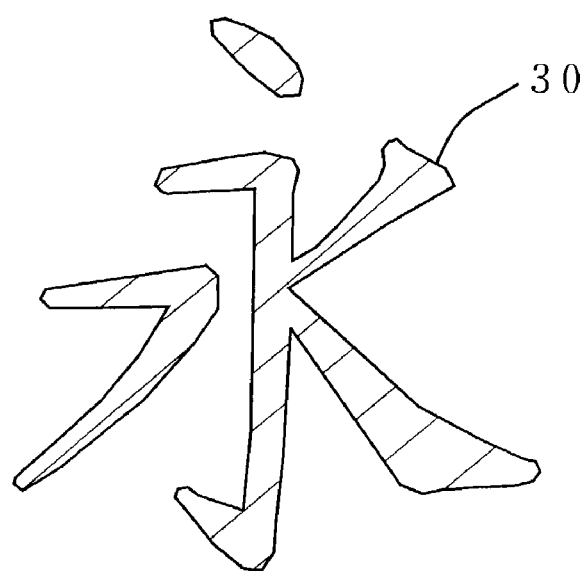

Referring to FIG. 5A, a character 30 is separated into several moving paths 26 and the complicated sections can be separated into several extra moving paths 26 in accordance with steps 1 to 4. Circle 28 moves along moving paths 26 and the radius of circle 28 is changed. Character 30 is the area where circle 28 moves through. The accomplished characters 30 are shown in FIGS. 5B, 5C and 5D.

Figure 6A:
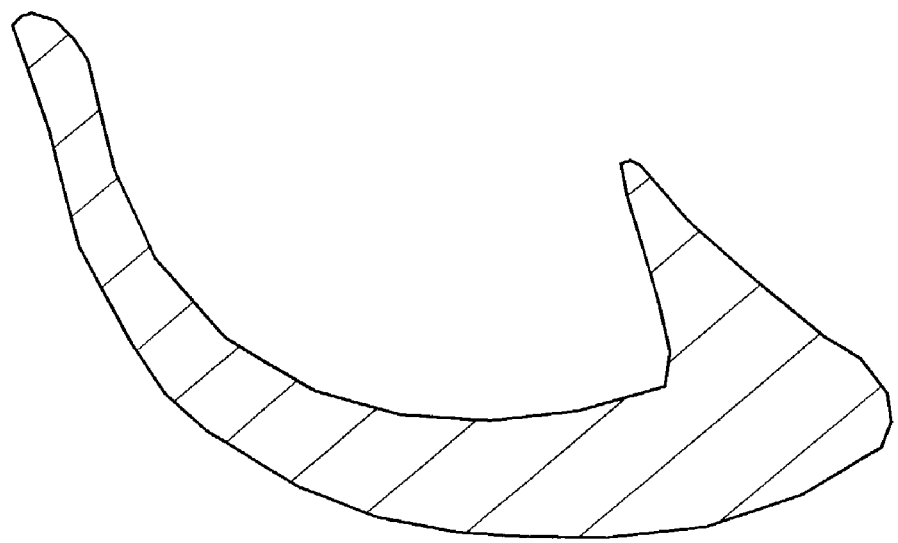
FIG. 6A to FIG. 6H are diagrams showing comparison among characters formed by a Chinese writing brush font, an outline font and a vector font.
Figure 6B:
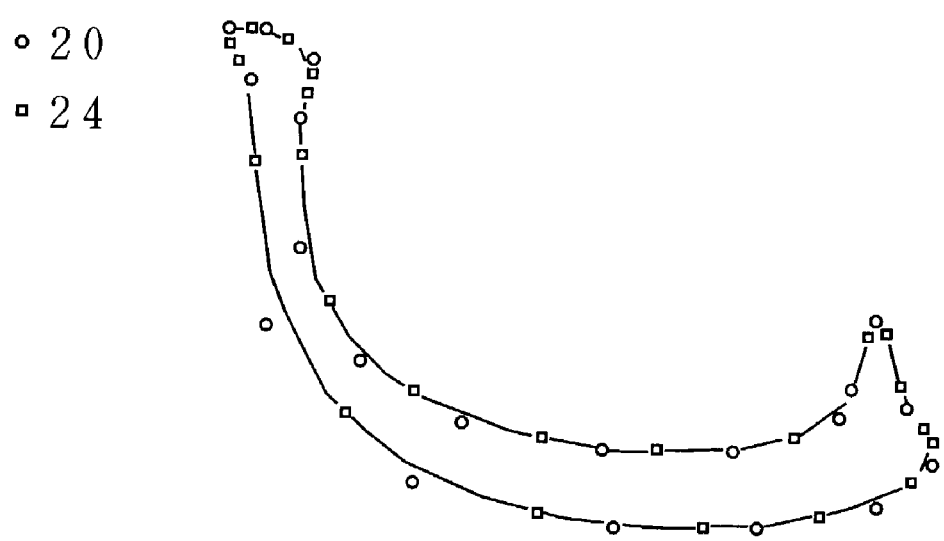
Figure 6C:
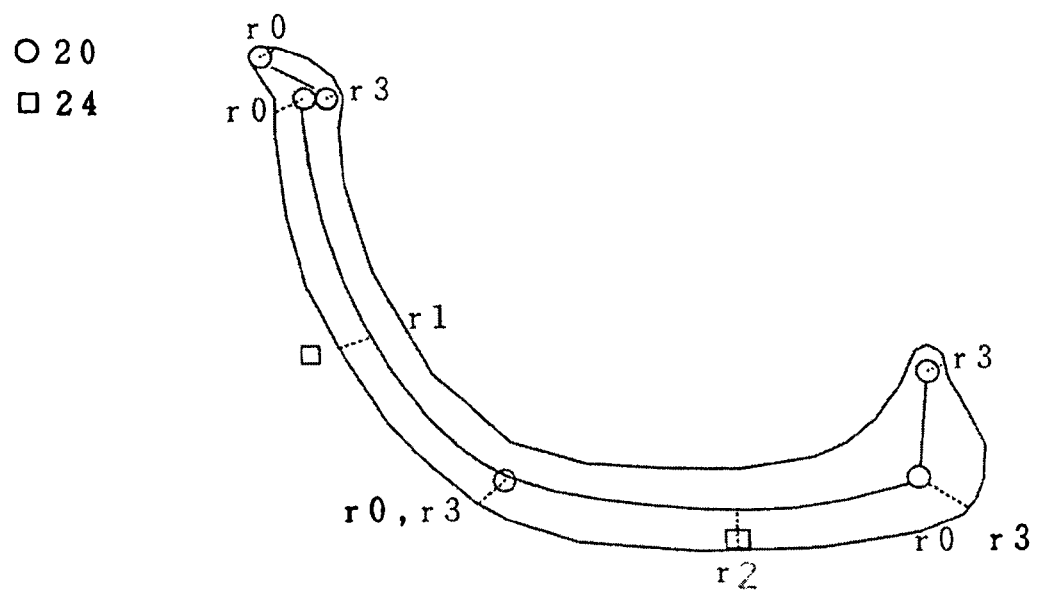

In the present invention, due to the use of the Chinese writing brush font data, the coordinates of starting control point 20, control points 24 and ending control point 22 on each of moving paths 26 and the parameters from the radius r(t) of circle 28, the amount of data in the present invention is less than the amount of data of an outline font and is equal to or slightly more than the amount of data of a vector font. For example, referring to FIG. 6A, a stroke of a character "心" is shown. This stroke needs 45 points including starting control points, control points, and ending control points if performed by means of an outline font, as shown in FIG. 6B. Referring to FIG. 6C, the stroke is separated into four moving paths 26 in the Chinese writing brush font consistent with the present invention, where starting control points 20 on first three moving paths 26 are ending control points 22 of last three moving paths 26. Therefore, the stroke has eight points including starting control points 20, control points 24 and ending control points 22. The stroke further needs eight radii $r_0$, $r_1$, $r_2$, and $r_3$ for description. If one datum has 8 bits, a coordinate (x, y) needs two data, i.e., 16 bits, and a radius needs one datum, i.e., 8 bits. Hence, in the example, an outline font needs totally 720 (=45×16) bits, and the present invention needs 192 (=8× 16+8×8) bits. The data needed by the present invention is one fourth the data needed by the outline font.

Figure 6D:
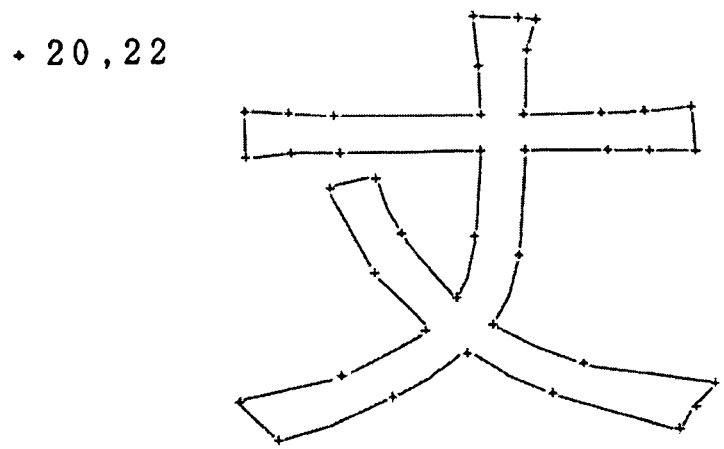
Figure 6E:
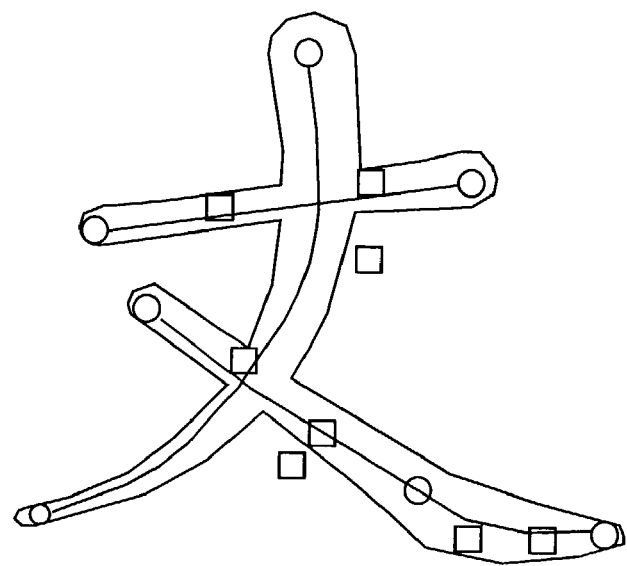
Figure 6F:
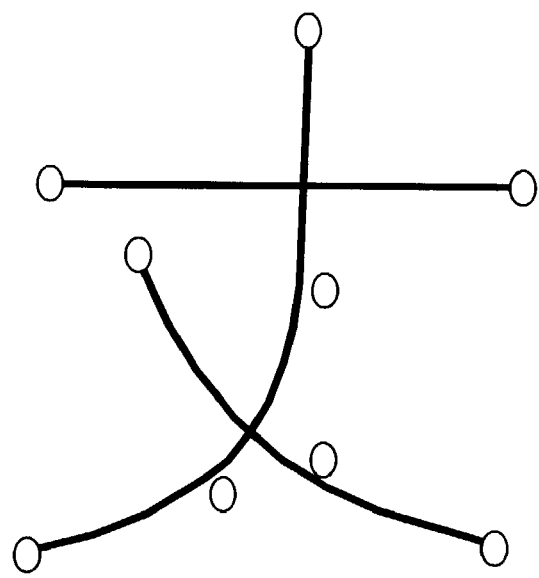
Figure 6G:
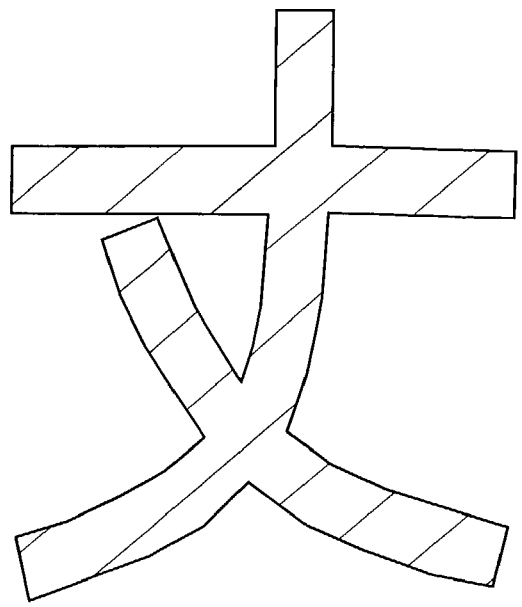
Figure 6H:
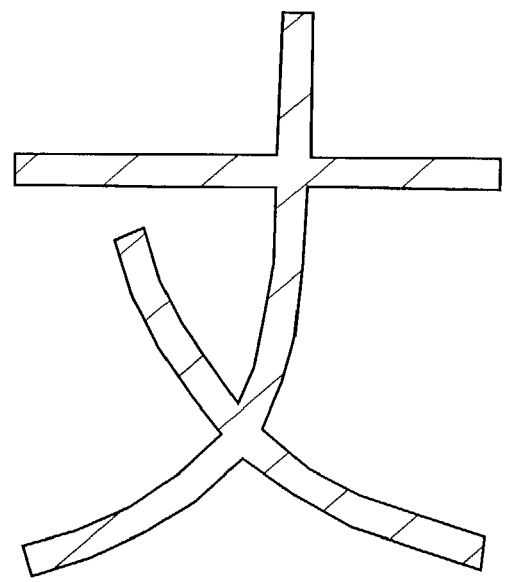

Referring to FIG. 6D, a whole character, "丈", needs totally 70 points including starting control points 20, control points 24 and ending control points 22. Due to the fact that too many points will complicate a figure, control points 24 are not shown in FIG. 6D. Referring to FIG. 6E, the Chinese writing brush font consistent with the present invention needs 15 points including starting control points, control points and ending control points. Referring to FIG. 6F, a vector needs 9 points including starting control points, control points and ending control points. Therefore, the font data of the present invention is greatly less than that of an outline font and slightly more than that of a vector font. Moreover, the Chinese writing brush font only needs extra data, 15 in total, for the radii $r_0$, $r_1$, $r_2$ and $r_3$ at the starting control points, control points and ending control to describe the variant of thickness of the character. Referring to FIGS. 6G and 6H, a vector font can only be displayed in lightface or boldface and cannot describe the variant of the thickness of strokes.

Table 1 shows the amount of data for an outline font, a vector font and the Chinese writing brush font of the present invention. In general, the amount of data for the outline font is about 5 to 12 mega bytes and the amount of data for the vector font is about 0.2 to 12 mega bytes. Hence, the ratio of the amount of data for the vector font to the amount of data for the outline font is about one fourth to one twentieth.

TABLE 1

| | Amount of Data (Mega Bytes) | | |
|---|---|---|---|
| Font Type | Outline Font | Chinese Writing Brush Font | Vector Font (Stroke-based font) |
| Data | 5-12 | 0.5-3 | 0.2-1.2 |
| Ratio (Compared with outline font) | | ¼-1/20 | 1/10-1/50 |

The amount of data for the Chinese writing brush font, like the amount of data for the vector font, is smaller than the amount of the data for the outline font. Moreover, a character described by the Chinese writing brush font looks as refined and beautiful as described by an outline font.

A character displayed in different sizes can be described by modulating the coordinates of starting control points 20, control points 24 and the ending control points 22 for the moving path 26 in a ratio of equality. The radius $r_i$ (i=0, 1, 2, . . .) of circle 28 may be modulated in the ratio of equality or a different ratio.

Furthermore, the present invention may be employed in composing fonts, i.e., forming character 30 by composing basic strokes of the character. The character is composed with data of the basic strokes needed and positions of the strokes. In accordance with strokes of a character stored in a database and the positions of the strokes, the character is composed by modulating the size of the strokes according to the size of the character. Hence, data of composing fonts include only the same strokes of characters 30 described by means of the Chinese writing brush font and the relative positions of strokes in the characters. The amount of data of the composing fonts is smaller than the amount of data comprising all of the characters. A character composed by the basic strokes of the composing fonts can be described by modulating the coordinates of starting control points 20, control points 24 and ending control points 22 of the basic strokes with a ratio of equality. The radius $r_i$(i=0, 1, 2, . . .) of circle 28 may be modulated with the ratio of equality or a different ratio.

According to the preferred embodiments, this invention discloses a method of font generation for displaying the thickness of strokes of a character. According to the method of font generation of the present invention, the amount of data is smaller than the amount of data for a bitmap font or an outline font, and is close to the amount of data for a vector font. Furthermore, the method consistent with the present invention can describe characters as an outline font without the disadvantages of a vector font, which cannot describe characters in a refined and beautiful manner. Moreover, the method avoids the disadvantages of distortion in resized characters and can easily keep the refined form of characters in modulating the size of the characters.

Although specific embodiments have been illustrated and described, it will be obvious to those skilled in conventional art that various modifications may be made without departing from the appended claims.

What is claimed is:

1. A method of font generation capable of displaying at least one stroke of a character having a varying thickness by means of a geometric figure centered on a moving path, comprising:
   determining the moving path for each of the at least one stroke in accordance with characteristics of the character, the characteristics including stroke thickness and stroke transition;
   dividing the moving path into at least one sub-path in accordance with the stroke transition of each of the at least one stroke;
   determining a number of control points for each sub-path based on a curvature of the at least one sub-path;
   using said control points to determine: (1) coefficients of a first set of equations that describe the coordinates of the at least one sub-path at any point on the sub-path, and (2) coefficients of a second set of equations that enumerate a dimension of the geometric figure at any point of the sub-path; and
   moving the center of the geometric figure along each of the at least one sub-path while varying the dimension of the geometric figure in accordance with the second set of equations such that an area swept out by said moving figure defines an area of the stroke,
   wherein one or more of determining the moving path, dividing the moving path, determining a number of control points, using said control points or moving the center of the geometric figure are performed by a computing apparatus.

2. The method of claim 1, further comprising providing the geometric figure in the shape of a circle.

3. The method of claim 1, further comprising providing the geometric figure in the shape of one of a rectangle, square or a regular polygon.

4. The method of claim 1, further comprising describing each of the at least one sub-path by coordinates of the respective control points.

5. The method of claim 1, further comprising describing the dimension of the geometric figure by one of a first-order, second-order or third-order equation.

6. The method of claim 1, wherein the character includes one of a Chinese character, Japanese character or Korean character.

7. The method of claim 1, further comprising describing each of the at least one sub-path by at least one of a first-order, second-order or third-order equation.

8. A method of font generation, comprising:
   determining characteristics of a stroke of a character, the characteristics including stroke thickness and stroke transition;
   dividing the stroke into at least one sub-stroke in accordance with the stroke transition;
   determining a moving path for each of the least one sub-stroke;
   providing a starting control point for the moving path of each of the least one sub-stroke;
   providing an ending control point for the moving path of each of the least one sub-stroke;
   determining a number of control points required for describing a curvature of each of the at least one sub-stroke;
   providing a geometric figure including a center;
   moving the center of the geometric figure along the moving path from the starting control point to the ending control point; and
   changing a dimension of the geometric figure in accordance with the characteristics of stroke thickness in moving the geometric figure along the moving path, wherein an area of the geometric figure inscribes a boundary as the geometric figure moves along the moving path
   wherein one or more of determining characteristics of a stroke, dividing the stroke, determining a moving path, providing a starting control point, providing an ending control point, determining a number of control points, providing a geometric figure, moving the center of the geometric figure or changing a dimension of the geometric figure are performed by a computing apparatus.

9. The method of claim 8, further comprising providing the geometric figure in the shape of a circle, a rectangle, a square or a regular polygon.

10. The method of claim 8, further comprising describing the moving path by one of a first-order, second-order or third-order function.

11. The method of claim 8, further comprising determining the coordinates of the starting control point, the ending control point and the control points.

12. The method of claim 11, further comprising changing a size of the character by changing the dimension of the geometric figure at each of the starting control point, the ending control point and the control points.

13. The method of claim 8, wherein determining characteristics of a stroke comprises determining characteristics of a stroke of a character in Chinese brush writing.

14. A method of font generation, comprising:
   determining characteristics of a stroke of a character, the characteristics including stroke thickness and stroke transition;
   dividing the stroke into at least one sub-stroke in accordance with the stroke transition;
   determining a moving path for each of the least one sub-stroke;
   providing a starting control point for the moving path of each of the least one sub-stroke;
   providing an ending control point for the moving path of each of the least one sub-stroke;
   determining a number of control points required based on a curvature of each of the at least one sub-stroke;
   providing a geometric figure including a center;
   moving the center of the geometric figure along the moving path from the starting control point to the ending control point to form a boundary, the control points for describing the curvature of each of the least one sub-stroke being allowed to be disposed away from the boundary;

storing the coordinates of the starting control point, the ending control point and the control points; and changing a size of the character by changing a dimension of the geometric figure at each of the starting control point the ending control point and the control points, wherein one or more of determining characteristics of a stroke, dividing the stroke, determining a moving path, providing a starting control point, providing an ending control point, determining a number of control points, providing a geometric figure, moving the center of the geometric figure, storing the coordinates or changing a size of the character are performed by a computing apparatus.

15. The method of claim 14, wherein moving the center comprises moving of the geometric figure along the moving path of each of the least one sub-stroke from the starting control point to the ending control point, and wherein changing a dimension of the geometric figure comprises changing a dimension of the geometric figure in accordance with the stroke thickness in moving the geometric figure along the moving path.

16. The method of claim 15, wherein providing a geometric figure comprises providing a geometric figure in the shape of a circle.

17. The method of claim 14, further comprising describing the moving path of each of the at least one stroke by one of a first-order, second-order or third-order function.

18. The method of claim 14, wherein determining characteristics of a stroke comprises determining characteristics of a stroke of a character in Chinese brush writing.

19. A method for generating a graphic representation of a stroke, the method comprising:

providing a starting control point and an ending control point for the stroke, the starting control point and the ending control point being at a center of a respective geometric figured inscribed in an area of the stroke;

providing one or more control points;

determining a first set of coefficients for a first set of equations to describe a moving path extending from the starting control point to the ending control point; and determining a second set of coefficients for a second set of equations to describe a variable width of the stroke extending from the starting control point to the ending control point, the first and the second set of coefficients being based on the starting control point, the ending control point and the one or more control points, the one or more control points being based on a curvature of the moving path, wherein one or more of providing a starting control point, providing one or more control points, determining a first set of coefficients or determining a second set of coefficients are performed by a computing apparatus.

20. The method of claim 19, wherein the geometric figure is a circle.

21. The method of claim 20, wherein the moving path is at the center of the circle inscribed in the area of the stroke.

* * * * *